US008767625B2

(12) United States Patent
Krishnaswamy et al.

(10) Patent No.: US 8,767,625 B2
(45) Date of Patent: Jul. 1, 2014

(54) METHOD FOR CONCURRENT BANDWIDTH AGGREGATION USING A SECOND PATH ON A SECOND WIRELESS NETWORK THAT UTILIZES THE PACKET CORE NETWORK OF A FIRST PATH ON A FIRST WIRELESS NETWORK

(75) Inventors: Dilip Krishnaswamy, San Diego, CA (US); Soumya Das, San Diego, CA (US); Samir S. Soliman, San Diego, CA (US); Srinivasa R. Eravelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/241,155

(22) Filed: Sep. 22, 2011

(65) Prior Publication Data

US 2012/0236801 A1 Sep. 20, 2012

Related U.S. Application Data

(60) Provisional application No. 61/454,080, filed on Mar. 18, 2011.

(51) Int. Cl.
*H04W 28/04* (2009.01)
*H04W 88/04* (2009.01)
*H04W 76/02* (2009.01)
*H04W 88/06* (2009.01)

(52) U.S. Cl.
CPC ............ *H04W 76/026* (2013.01); *H04W 88/06* (2013.01)
USPC .......................................... 370/328; 370/329

(58) Field of Classification Search
CPC ... H04W 28/04; H04W 72/04; H04W 72/042; H04W 88/08; H04W 80/04; H04W 88/06; H04W 84/18; H04L 5/0007; H04L 29/06
See application file for complete search history.

(56) References Cited

U.S. PATENT DOCUMENTS

2004/0170181 A1* 9/2004 Bogdon et al. ................ 370/400
2006/0193295 A1* 8/2006 White et al. .................. 370/336
(Continued)

FOREIGN PATENT DOCUMENTS

EP          1777925 A2    4/2007
WO     2007031604 A1    3/2007
(Continued)

OTHER PUBLICATIONS

Sarkar, D, "A Concurrent Multipath TCP and Its Markov Model", This paper appears in: Communications, 2006. ICC '06, IEEE International Conference on Date of Conference: Jun. 2006, Department of Computer Science, University of Miami, E-Mail: sarkar@miami.edu; Date: Feb. 2006. vol. 2, pp. 615-620.*

(Continued)

*Primary Examiner* — Andrew Lai
*Assistant Examiner* — Hoyet H Andrews
(74) *Attorney, Agent, or Firm* — Jeffrey D. Jacobs

(57) ABSTRACT

A method for concurrent bandwidth aggregation (COBA) for a client via multiple wireless networks includes requesting a packet data session for a first path on a first wireless network using a first modem of the multi-modem UE via a packet core network of the first wireless network. The method further includes requesting a packet data session for a second path on a second wireless network via the packet core network of the first wireless network using a second modem of the multi-modem UE. The method also includes receiving packet data over at least the second path on the second wireless network via the packet core network of the first wireless network.

34 Claims, 15 Drawing Sheets

(56) References Cited

U.S. PATENT DOCUMENTS

| | | | |
|---|---|---|---|
| 2007/0109990 A1* | 5/2007 | Bennett | 370/328 |
| 2007/0110035 A1* | 5/2007 | Bennett | 370/352 |
| 2008/0311855 A1* | 12/2008 | Manousakis et al. | 455/67.11 |
| 2009/0016245 A1* | 1/2009 | Karls | 370/310 |
| 2009/0201813 A1* | 8/2009 | Speight | 370/235 |
| 2012/0236801 A1* | 9/2012 | Krishnaswamy et al. | 370/329 |
| 2012/0243441 A1* | 9/2012 | Reunamaki et al. | 370/255 |

FOREIGN PATENT DOCUMENTS

| | | | |
|---|---|---|---|
| WO | 2010063119 A1 | | 6/2010 |
| WO | WO/2010/109054 | * | 9/2010 |
| WO | WO 2010109054 A1 | * | 9/2010 |
| WO | WO/2011/073495 | * | 6/2011 |
| WO | WO 2011073495 A1 | * | 6/2011 |

OTHER PUBLICATIONS

Key, P., Massoulie, L.; Towsley, D., "Multipath Routing, Congestion Control and Dynamic Load Balancing", this paper appears in: Acoustics, Speech and Signal Processing, 2007. ICASSP 2007, IEEE International Conference on Date of Conference: Apr. 15-20, 2007, vol. 4, pp. IV-1341-IV-1344.*

Evensen, Kristian, Kaspar, Dominik, Engelstad, Paal, Hansen, Audun F., Griwodz, Carsten, Halvorsen, Pål, "A Network-Layer Proxy for Bandwidth Aggregation and Reduction of IP Packet Reordering", this paper was published at Conference on Local Computer Networks, 2009. LCN 2009. IEEE 34th Conference , Publication Year: 2009 , pp. 585-592.*

3GPP TR 25.936 V4.0.1 (Dec. 2001), (3GPP—TR 25.936 ), titled "Technical Report 3rd Generation Partnership Project (3GPP);Technical Specification Group (TSG) RAN 3;Handovers for real-time services from PS domain;(Release 4)" (3GPP—TR 25.936 hereinafter) was published in Jan. 9, 2009.*

Evensen, K.; Kaspar, D.; Engelstad, P.; Hansen, A.F.; Griwodz, C.; Halvorsen, P., "A network-layer proxy for bandwidth aggregation and reduction of IP packet reordering," Local Computer Networks, 2009. LCN 2009. IEEE 34th Conference on , vol., no., pp. 585-592, Oct. 20-23, 2009, doi: 10.1109/LCN.2009.5355198.*

Kristian Evensen, Dominik Kaspar, Paul Engelstad, Audun F. Hansen, Carsten Griwodz, and Pal Halvorsen, (Evensen et al.), titled "A Network-Layer Proxy for Bandwidth Aggregation and Reduction of IP Packet Reordering" (Evensen hereinafter) was published in 2009 IEEE 34th Conference on Local Computer Networks (LCN 2009), pp. 585-592.*

3GPP—TR 25.936, 3GPP TR 25.936 V4.0.1 (Dec. 2001), (3GPP—TR 25.936 ), titled "Technical Report 3rd Generation Partnership Project (3GPP);Technical Specification Group (TSG) RAN 3;Handovers for real-time services from PS domain;(Release 4)" (3GPP—TR 25.936 hereinafter) was published in Jan. 9, 2009, pp. 1-35.*

3GPP TS 36.413 V10.0.1 (Jan. 2011) Technical Specification, titled "3rd Generation Partnership Project; Technical Specification Group Radio Access Network; Evolved Universal Terrestrial Radio Access Network (E-UTRAN); S1 Application Protocol (S1AP) (Release 10)", published on 3GPP website, pp. 1 through 250, Jan. 2011.*

3GPP TR 25.931 V9.0.0 (Dec. 2009), Technical Report, titled "3rd Generation Partnership Project; Technical Specification Group Radio Access Network; UTRAN functions, examples on signaling procedures (Release 9)", published on 3GPP website, pp. 1 through 130, Dec. 2009.*

Chebrolu et al., "Bandwidth aggregation for real-time applications in heterogeneous wireless networks", IEEE Transactions on Mobile Computing, Apr. 1, 2006, pp. 388-403, vol. 5, No. 4, IEEE Service Center, XP001545978, ISSN: 1536-1233.

International Search Report and Written Opinion—PCT/US2012/029709—ISA/EPO—Jul. 4, 2012.

* cited by examiner

METHOD FOR CONCURRENT BANDWIDTH AGGREGATION USING A SECOND PATH ON A SECOND WIRELESS NETWORK THAT UTILIZES THE PACKET CORE NETWORK OF A FIRST PATH ON A FIRST WIRELESS NETWORK

CROSS-REFERENCE TO RELATED APPLICATION

This application claims the benefit under 35 U.S.C. §119(e) to U.S. Provisional Patent Application No. 61/454,080 entitled "Method for concurrent bandwidth aggregation using a second path on a second wireless network that utilizes the packet core network of a first path on a first wireless network", filed on Mar. 18, 2011, the disclosure of which is expressly incorporated by reference herein in its entirety.

BACKGROUND

1. Field

Aspects of the present disclosure relate generally to wireless communication systems, and more particularly to concurrent bandwidth aggregation.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to one aspect of the present disclosure, a method for concurrent bandwidth aggregation (COBA) for a client via multiple wireless networks is described. The method includes requesting a packet data session for a first path on a first wireless network using a first modem of the multi-modem UE via a packet core network of the first wireless network. The method further includes requesting a packet data session for a second path on a second wireless network via the packet core network of the first wireless network using a second modem of the multi-modem UE. The method also includes receiving packet data over at least the second path on the second wireless network via the packet core network of the first wireless network.

In another aspect, an apparatus for concurrent bandwidth aggregation (COBA) for a client via multiple wireless networks is described. The apparatus includes at least one processor; and a memory coupled to the at least one processor. The processor(s) is configured to request a packet data session for a first path on a first wireless network using a first modem of the multi-modem UE via a packet core network of the first wireless network. The processor(s) is also configured to request a packet data session for a second path on a second wireless network via a packet core network of the first wireless network using a second modem of the multi-modem UE. The processor(s) is further configured to receive packet data over at least the second path on the second wireless network via the packet core network of the first wireless network.

In a further aspect, a computer program product for concurrent bandwidth aggregation (COBA) for a client via multiple wireless networks is described. The computer program product includes a non-transitory computer-readable medium having program code recorded thereon. The computer program product has program code to request a packet data session for a first path on a first wireless network using a first modem of the multi-modem UE via a packet core network of the first wireless network. The computer program product also includes program code to request a packet data session for a second path on a second wireless network via the packet core network of the first wireless network using a second modem of the multi-modem UE. The computer program product further includes program code to receive packet data over at least the second path on the second wireless network via the packet core network of the first wireless network.

In another aspect, an apparatus for concurrent bandwidth aggregation (COBA) for a client via multiple wireless networks is described. The apparatus includes means for requesting a packet data session for a first path on a first wireless network using a first modem of the multi-modem UE via a packet core network of the first wireless network. The apparatus further includes means for requesting a packet data session for a second path on the second wireless network via the packet core network of the first wireless network using a second modem of the multi-modem UE. The apparatus also includes means for receiving packet data over at least the second path on the second wireless network via the packet core network of the first wireless network.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
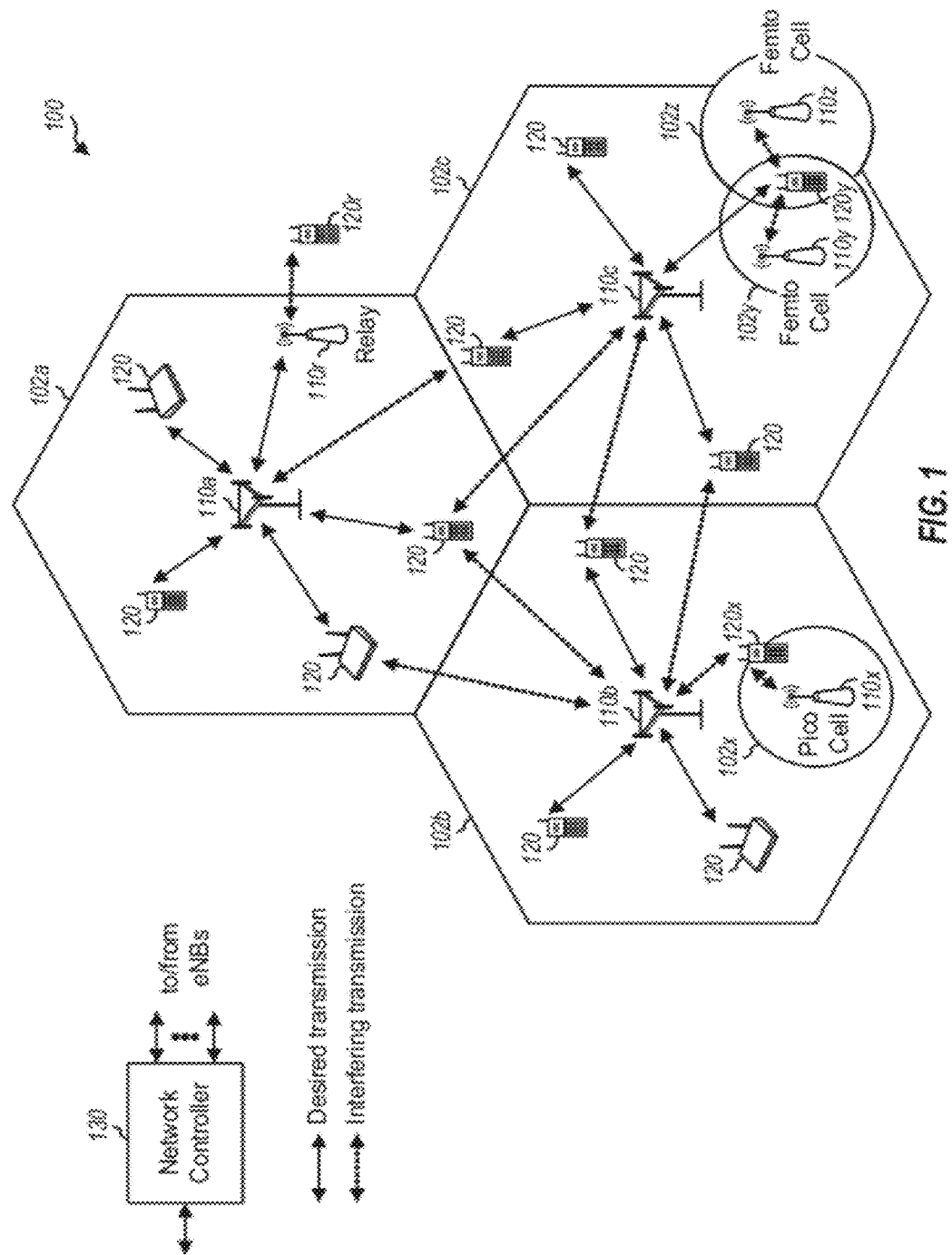
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA (Code Division Multiple Access), TDMA (Time Division Multiple Access), FDMA (Frequency Division Multiple Access), OFDMA (Orthogonal Frequency Division Multiple Access), SC-FDMA (Single-Carrier Frequency Division Multiple Access) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like.

The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2).

The UTRA technology also includes High-Speed Downlink Packet Access (HSDPA), High Speed Packet Access (HSPA), evolved HSPA (HSPA+), and the like. HSDPA, Release 5, is an extension of WCDMA with enhanced downlink performance; Release 6 provides an Enhanced Uplink. HSPA may refer to operation of HSPDA, with Enhanced Uplink and backward compatibility. The infrastructure for HSPA is already in place due to the commercial operation of WCDMA, HSPDA, and HSPA throughout the world. HSPA evolution (HSPA+) is designed to reach near the characteristics of LTE while maintaining backward compatibility.

The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network, in which a method for concurrent bandwidth aggregation using a second path on a second wireless network that utilizes the packet core network of a first path on a first wireless network may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
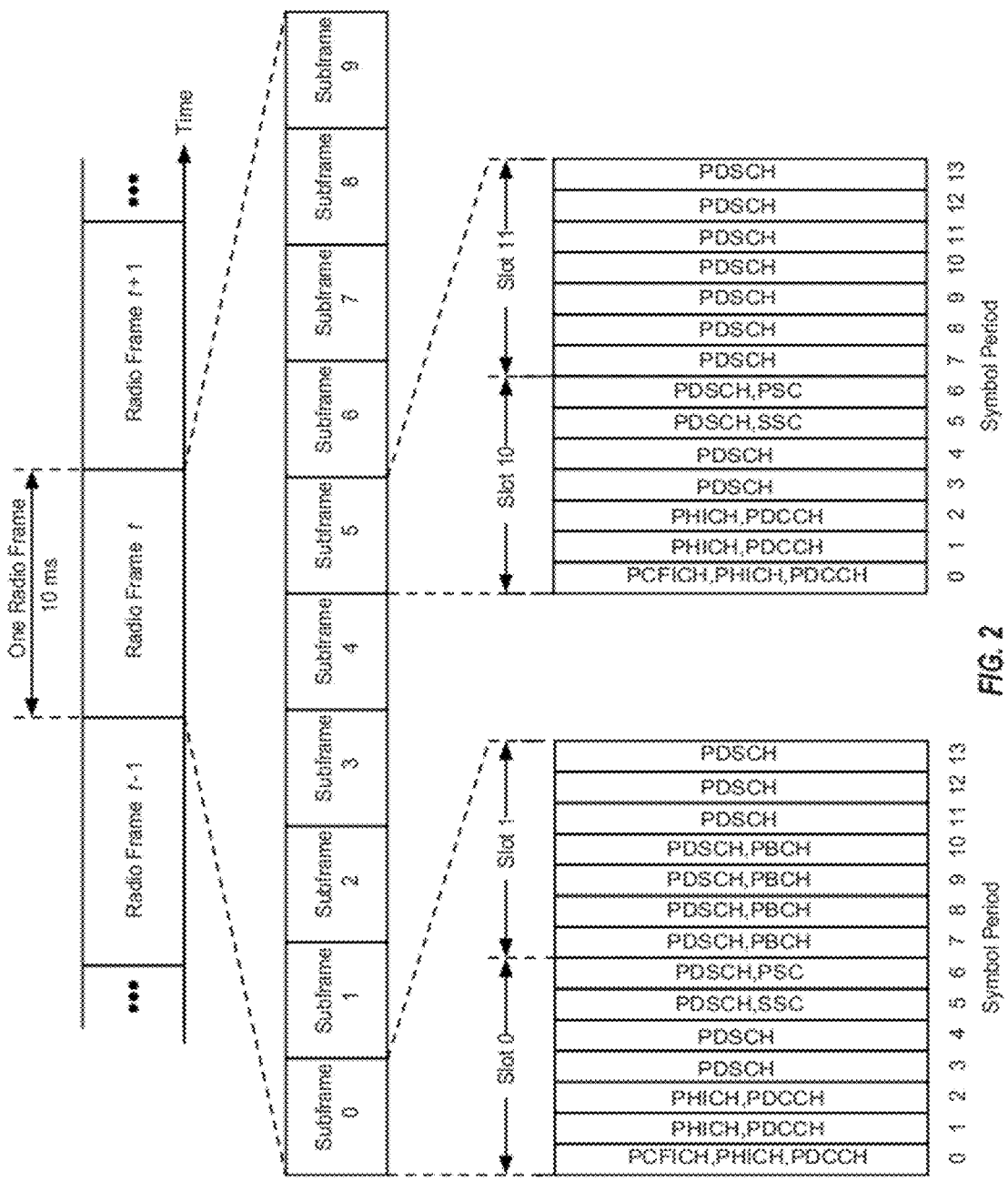
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARM). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
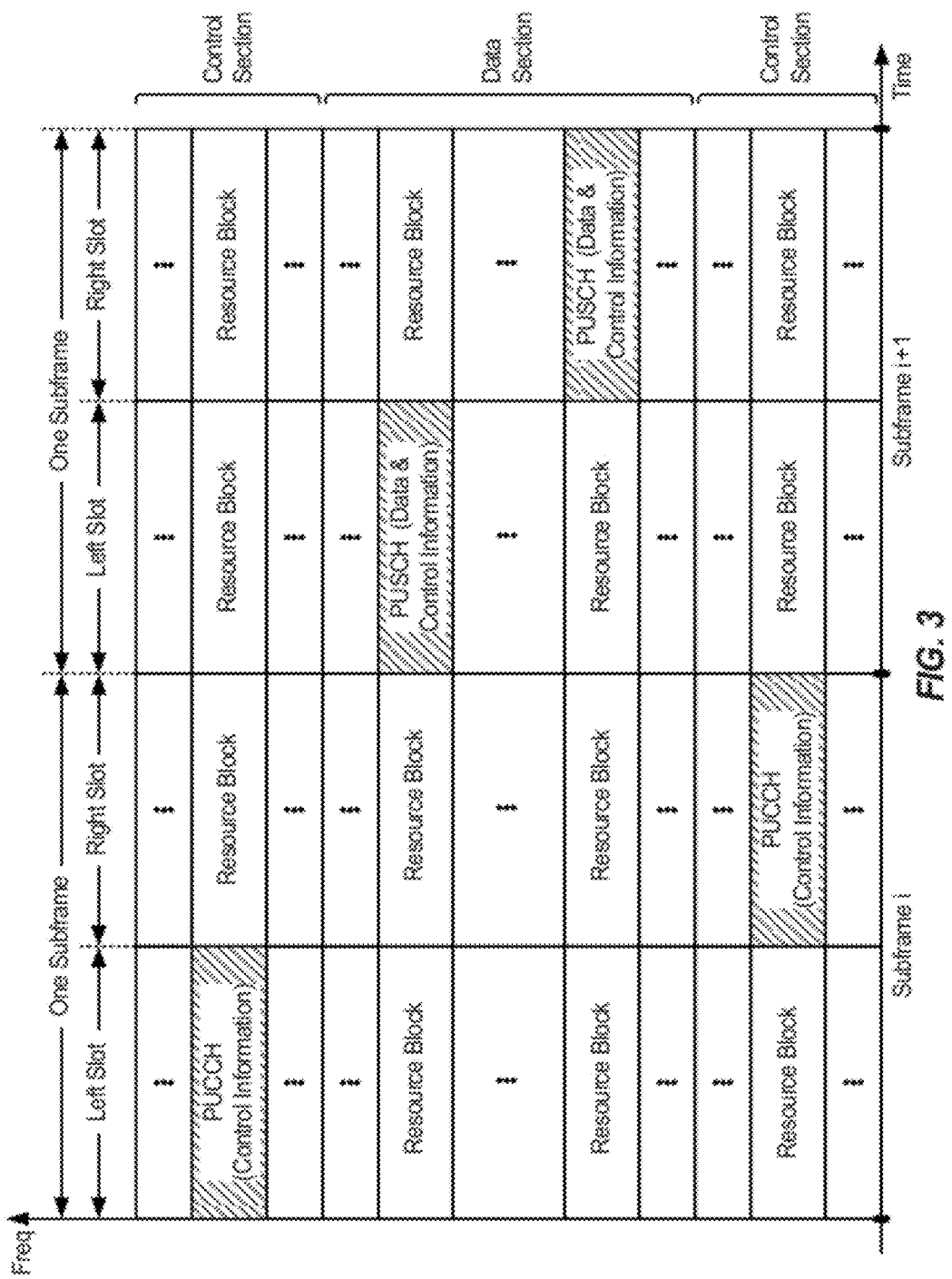
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

Figure 4:
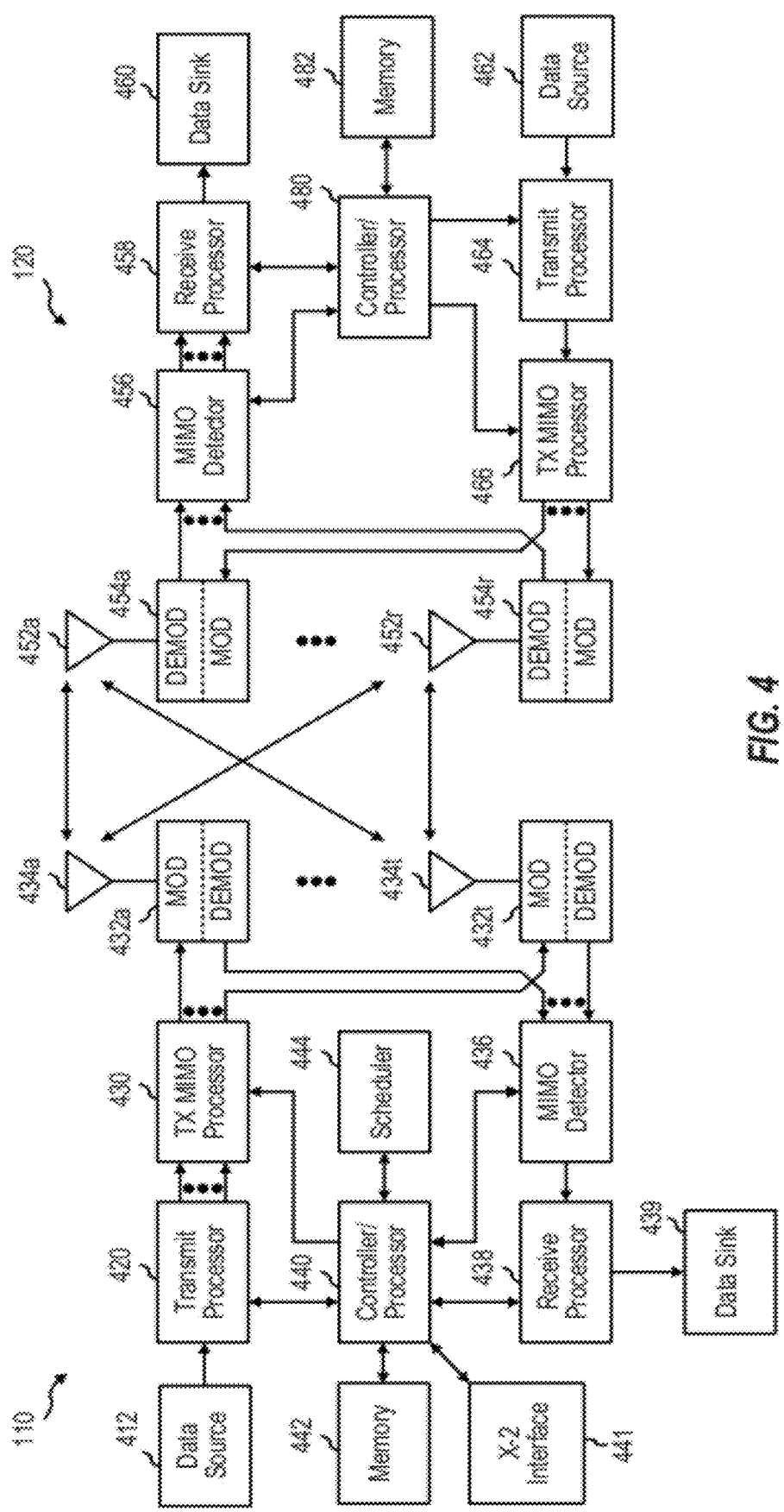
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIG. 15, and/or other processes for the techniques described herein. The memories 442 and 482 may store data and program codes for the base station 110 and the UE 120, respectively. A scheduler 444 may schedule UEs for data transmission on the downlink and/or uplink.

Concurrent Bandwidth Aggregation Using a Second Path on a Second Wireless Network that Utilizes the Packet Core Network of a First Path on a First Wireless Network As indicated above, High Speed Packet Access (HSPA) may refer to operation of High-Speed Downlink Packet Access (HSDPA), with Enhanced Uplink and backward compatibility. HSPA evolution (HSPA+) is designed to reach near the characteristics of Long Term Evolution (LTE) while maintaining backward compatibility when using a five megahertz (5 MHz) spectrum. An Evolved Packet Core (EPC) may allow coexistence between HSPA+ and LTE. The infrastructure for HSPA is already in place due to the commercial operation of WCDMA, HSDPA, and HSPA throughout the world. Furthermore, because HSPA+ is backward compatible and because the EPC provides support for both HSPA+ and LTE, LTE is being initially deployed in smaller areas according to, for example, a graduated network upgrade.

In one aspect, a method for concurrent bandwidth aggregation (COBA) for a client via multiple wireless networks is described. In one configuration, a secondary aggregation path through a second wireless access network is established via the packet core network for a first path via a first wireless network. In particular, either robust or additive aggregation can be attempted using both paths. In one aspect, aggregation is managed with a multipath-session in a network interacting with a peer multipath session on a client. In one configuration, the first wireless network is an LTE network and the second wireless access network is an HSPA network.

Figure 5:
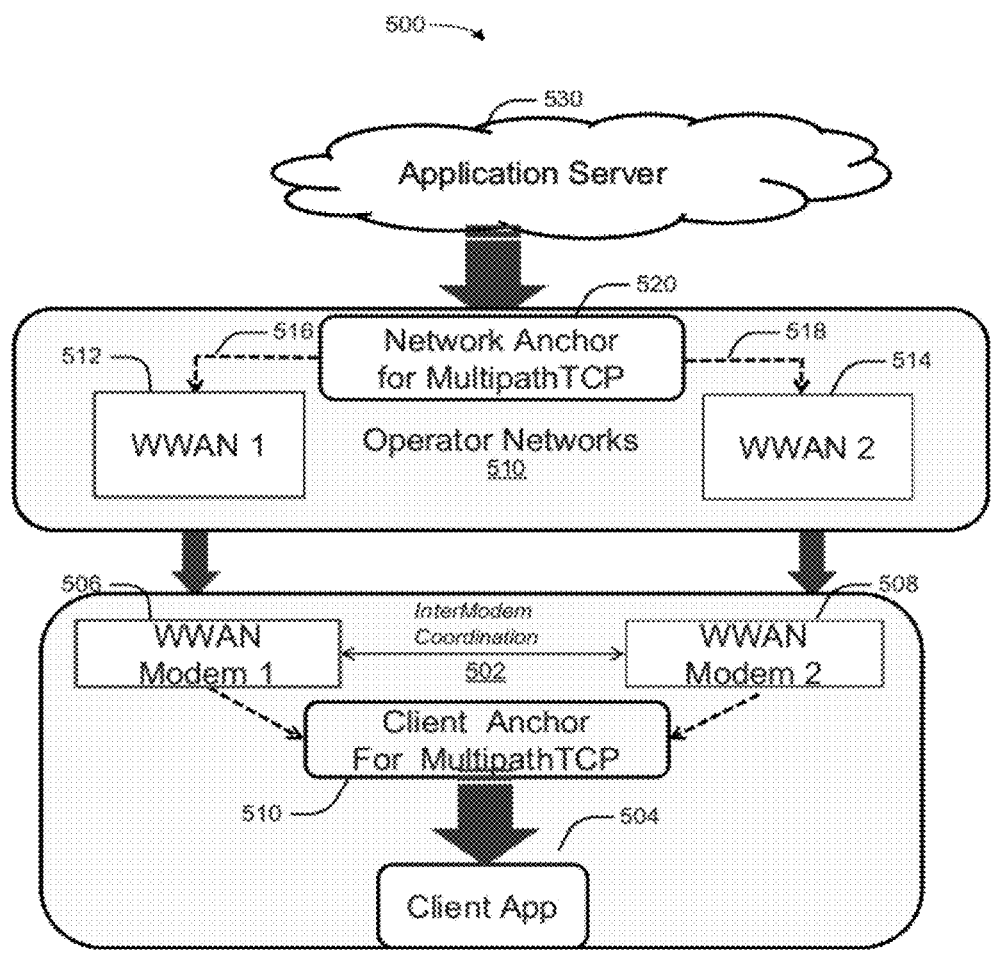
FIG. 5 is a block diagram illustrating a Multipath Transport Control Protocol (MultipathTCP) Tunnel for Concurrent Bandwidth Aggregation (COBA) according to one aspect of the disclosure.

FIG. 5 is a block diagram 500 illustrating a COBA client application 504 of a multi-modem user equipment (UE) 502 that connects to multiple wireless wide area networks (e.g., WWAN1 512 and WWAN2 514) of the operator networks 510. In one configuration, the COBA client application 504 uses multiple WWAN modems (e.g. modem 506 and modem 508) for accessing an application server 530. In this configuration, the Internet Protocol (IP) addresses obtained from each of the WWANs 512 and 514 are used at a Multipath Transport Control Protocol (TCP) (MultipathTCP) layer (e.g., client anchor for MultipathTCP), using different available paths.

A COBA client application 504 can get IP addresses for packet data sessions (such as Packet Data Protocol (PDP) contexts) that it establishes using the WWAN modems 506 and 508 on the UE 502. In one aspect, COBA proxy nodes (neighboring devices near the client which have their own WWAN modems, and that can communicate with the client over a local wired or wireless link) deliver IP addresses to the COBA client application 504.

In one configuration, the communication modems 506 and 508 on the UE 502 and/or neighboring devices, can exchange information to determine the wireless networks to use for aggregation. In this configuration, the COBA client application 504 uses available IP addresses to set up a MultipathTCP transport tunnel with a COBA tunneling anchor 520 in the network infrastructure. Available paths may be added or deleted dynamically as they become available based on a user's mobility and the availability of proxy aggregating devices. Representatively, based on the bandwidth available (such as based on congestion window estimation for each sub flow, or the QoS expected for the WWAN PDP context, or based on dynamic WWAN link conditions delivered using lightweight overlays), the aggregated traffic from an application server 530 can be split proportionately across the paths (e.g., 516 and 518).

Based on the delays over each of the paths 516 and 518 (such as using a round trip time (RTT) estimation for each sub-flow), inter-path delay skews can be determined for improving packets scheduling across the sub-flows. For example, a delayed transmission over a path with smaller delay or early an transmission over a path with longer delay may be performed to reduce buffering requirements at the client device. In one configuration, the tunneling server/anchor 520 can be located purely within the WWAN infrastructure that supports the multiple carriers. When multiple WWANs are needed to support different WWAN carriers, then the tunneling server 540 can be located external to the WWANs or anchored at one of the WWANs. Accordingly, legacy application servers can leverage the aggregated performance without needing to support a Multipath TCP.

According to aspects of the present disclosure, different WWANs can be considered such a Long Term Evolution (LTE) network, a High Speed Packet Access (HSPA) Network, and a Worldwide Interoperability for Microwave Access (WiMAX) Network, a Wireless Local Area Network (WLAN), a Code Division Multiple Access 2000 1x (CDMA20001x) Network, a Universal Mobile Telecommunication System (UMTS) Network, a TV Whitespace wireless network, and the like. In one configuration, each WWAN 512 and 514 can be the same standard (e.g., both WWANs can be LTE over different channels). In a further configuration, the WWANs 512 and 514 may operate according to different standards (e.g., one LTE WWAN and one HSPA WWAN). In either of these configurations, the bandwidth on each WWAN channel can be same (e.g., 5 MHz or 20 MHz) or different (e.g., 5 MHz for the first WWAN and 10 MHz for the second WWAN).

In one aspect of the present disclosure, an IP address is obtained from each available network, and a tunnel (VPN) IP address is obtained for the multipath tunnel 520. In this configuration, the multipath tunnel 520 uses the IP addresses from each of the networks for performing accomplish the aggregation. In general, aggregation can be accomplished using multiple wireless networks over different WWAN data technologies. In one configuration, a lowest cost path (e.g., energy/bit, or price*energy/bit) is used at times when bandwidth requirements are low, such that the chosen path meets any current delay requirements. When higher bandwidths are needed, then additional available WWAN paths are activated, used, and then released. Paths can be dynamically added or deleted within the MultipathTCP tunnel.

In one configuration, a Robust aggregation is used to guarantee performance by using a second path (e.g., 518) as a fall-back option if there is performance degradation on the first path (e.g., 516). In a further configuration, an Additive aggregation is used for aggressively pursuing additional bandwidth via the second path (e.g., 518) to augment the bandwidth available on the first path (e.g., 516). In addition, if the performance of one path exceeds that of another path, then the system can determine not to use the path with the poorer performance. The performance capability may be determined based on a dynamic available bandwidth or a dynamic delay that is perceived on each path. In one configuration, a tunnel persists during transitions between states of a single-path-utilization and a multipath-utilization in the system.

Figure 6:
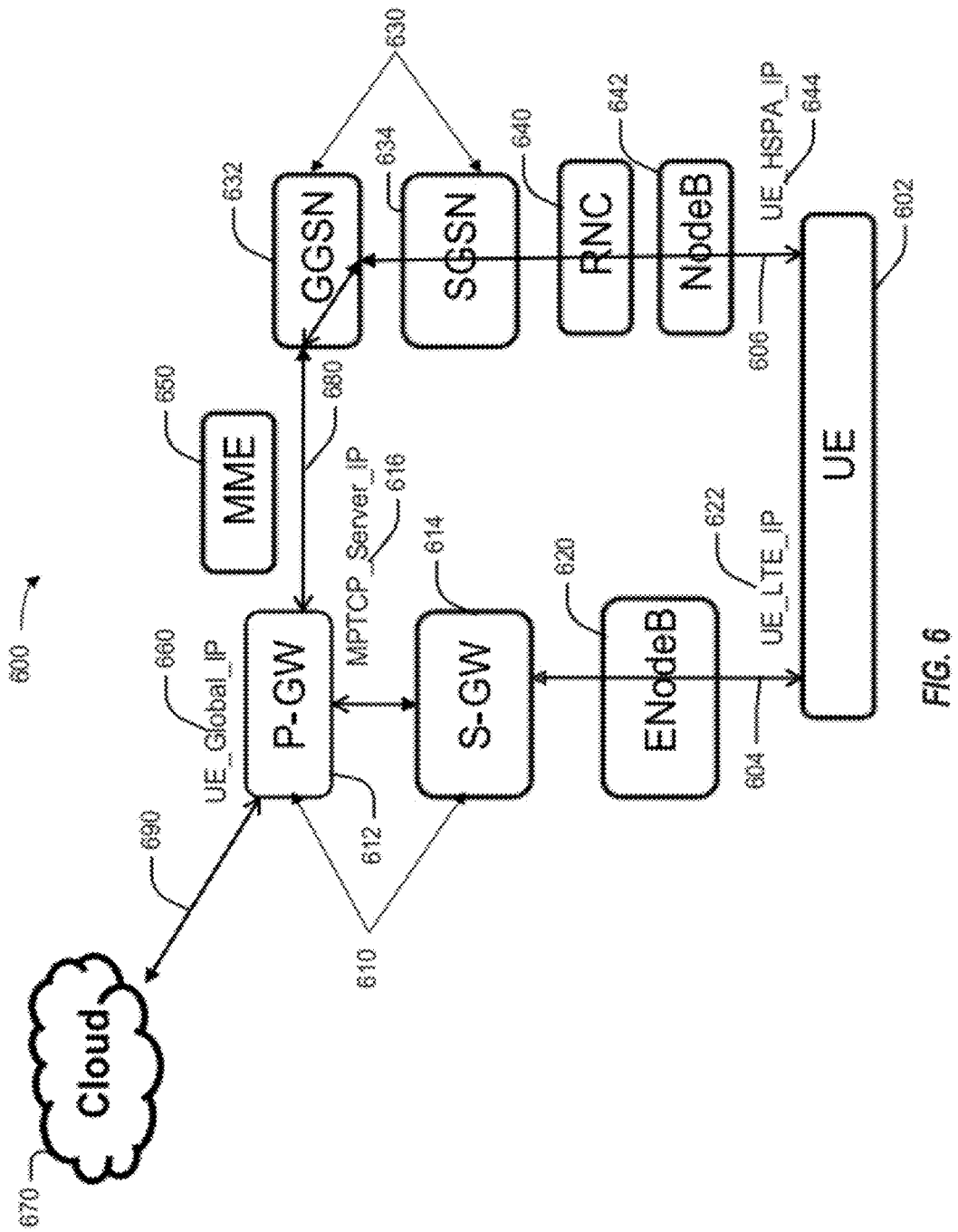
FIG. 6 is a block diagram illustrating Concurrent Bandwidth Aggregation across first and second Wireless Wide Area Networks (WWANs) according to one aspect of the present disclosure.

FIG. 6 is a block diagram 600 illustrating concurrent bandwidth aggregation across first and second Wireless Wide Area Networks (WWANs) according to one aspect of the present disclosure. Representatively, FIG. 6 shows the connectivity when the respective packet cores (e.g. 610 and 630) are used for each network that converge at one of the core networks 610. A Mobility Management Entity 650 is provided. To minimize differential delay in the paths, the paths could share a common path through the WWANs as far as possible before they split. In an LTE network, IP packets are delivered by the LTE EPC (Evolved Packet Core) 610 to an eNodeB 620 on a downlink path 604. IP packets are also received by the LTE EPC 610 from the eNodeB 620 for an uplink path from a client User Equipment (UE) 602. In one configuration, the LTE EPC 610 comprises the S-GW (Serving-Gateway) 614 and the P-GW (Packet-Gateway or Packet-data-network-Gateway) 612.

In a High Speed Packet Access (HSPA) network, IP packets are delivered by an HSPA PC (Packet Core) 630 to a Radio Network Controller (RNC) 640 and a NodeB 642 on a downlink path 606. In addition, packets are received by the HSPA PC 630 from the RNC 640 for an uplink path from a client (UE) 602. In one configuration, the HSPA PC 630 comprises an SGSN (Serving GPRS Support Node) 634 and a GGSN (Gateway GPRS Support Node) 632, which communicates with the P-GW 612 via a link 680.

FIG. 6 shows a possible location of a MultipathTCP anchor at the Packet Data Network-Gateway (P-GW or PDN-GW) 612 of an LTE Evolved Packet Core (EPC) 610 to aggregate performance across the LTE and the HSPA networks according to one aspect of the present disclosure. Representatively, IP packets for the LTE connection for a client (UE) 602 traverse through the LTE EPC 610. Similarly, IP packets for the HSPA connection for the client (UE) 602 traverse through the HSPA PC 630. In one configuration, the MultipathTCP anchor uses the MPTCP_Anchor_IP 616 as a source IP address and the UE_LTE_IP 622 as the destination IP address for the LTE downlink 604. In this configuration, the MultipathTCP anchor uses the MPTCP_Anchor_IP 616 as the source IP address and the UE_HSPA_IP 644 as the destination IP address for the HSPA downlink 606.

In one aspect, when the LTE network is lost due to mobility, a multipath session is managed via the P-GW 612. In particular, packets are forwarded between the GGSN 632 and the P-GW 612 for maintaining session continuity. Similarly, when only the LTE path 604 is available and the HSPA path 606 is lost due to user mobility, only the LTE path 604 is used. In this configuration, both the LTE path 604 and the HSPA path 606 can be used for aggressive bandwidth aggregation when both paths are available. In addition, both the LTE path 604 and the HSPA path 606 can be used for reliable aggregation.

In a further configuration, the MultipathTCP anchor uses the MPTCP_Anchor_IP 616 as the destination IP address and the UE_LTE_IP 622 as the source IP address for the LTE uplink 604. In this configuration, the MultipathTCP anchor uses the MPTCP_Anchor_IP 616 as the destination IP address and the UE_HSPA_IP 644 as the source IP address for the HSPA uplink 606. In one aspect, the UE 602 uses only one of the links on the uplink depending on the uplink bandwidth requirements and the RF transmit power constraints. For example, if two devices (e.g., a phone and a tablet bonded over WiFiDirect p2p for example) comprise a superUE that engages in multipath aggregation, then each device can just use one of the networks, thereby relaxing RF transmission power constraints.

Figure 7:
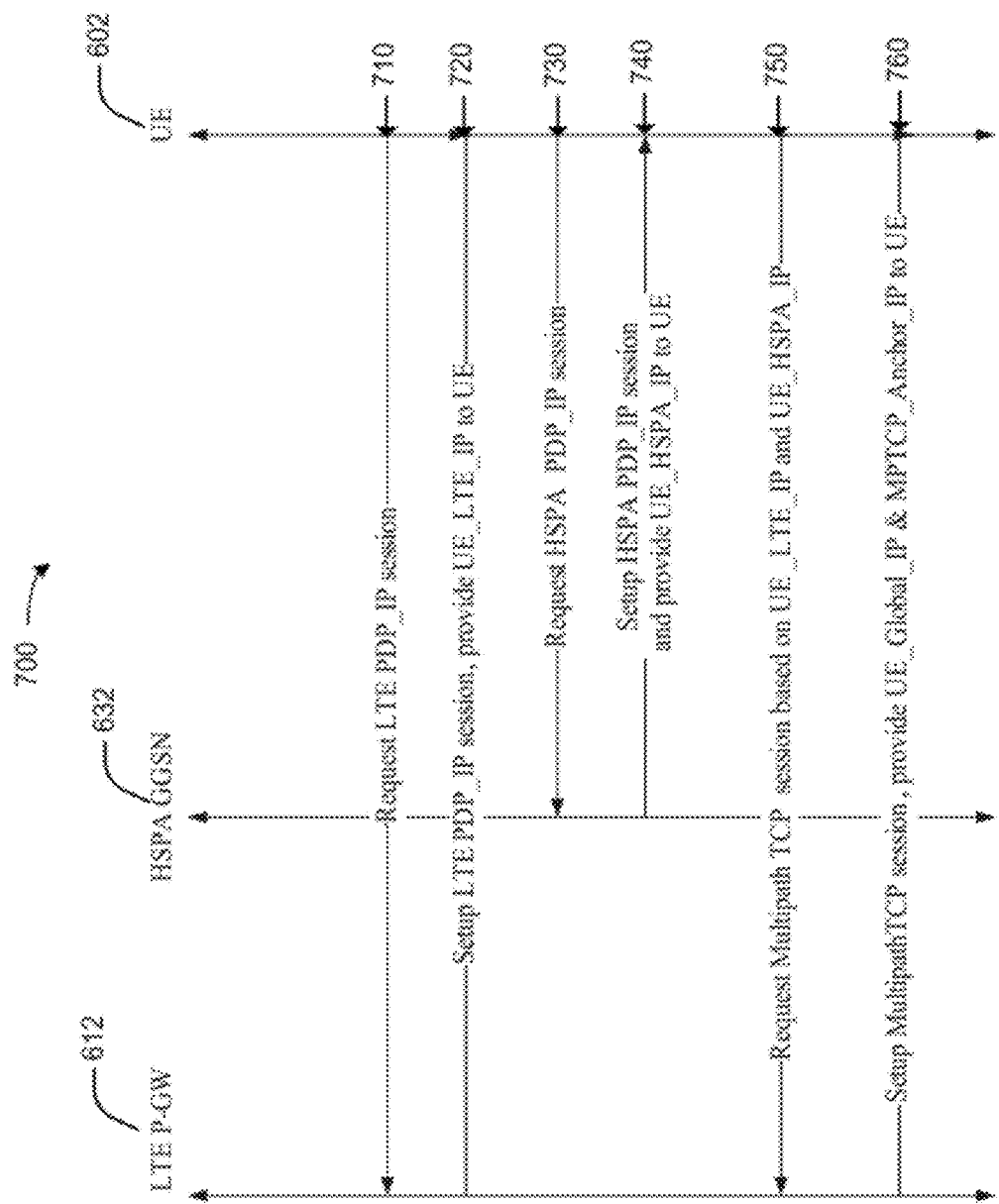
FIG. 7 is a call flow diagram illustrating setup of a MultipathTCP session over first and second Wireless Wide Area Networks (WWANs) according to one aspect of the present disclosure.

FIG. 7 is a call flow diagram 700 illustrating an exemplary setup of a MultipathTCP session over first and second Wireless Wide Area Networks (WWANs) according to one aspect of the present disclosure. Representatively, the call flow diagram 700 depicts a process for a COBA client UE (User Equipment) 602 to set up a multipath transport tunneling aggregation session. In one configuration, the aggregation session is setup with a multipath transport capable tunneling server via LTE and HSPA networks, anchored at an LTE P-GW 612, as shown in FIG. 6.

As shown in FIG. 7, the client device (UE—User Equipment) 602 can request at times 710 and 720 an IP address (UE_LTE_IP) 622 over its LTE connection 604. The client device 602 can additionally request an IP address (UE_HSPA_IP) 644 at times 730 and 740 over its HSPA connection 606. If the UE 602 decides to operate using MultipathTCP, it provides both its IP addresses to the MultipathTCP Tunneling Anchor in the EPC at time 750. The EPC 610 then provides the tunneling address (UE_Global_IP) 660 for the client at time 760 and this address 660 is used by applications on the client device to interact with an application server on the Internet (e.g., the Cloud 670 via a link 690). For example, a five megahertz (5 MHz) HSPA spectrum could be aggregated with a 5 MHz LTE spectrum (for geographies where there is limited spectrum available to launch an LTE network). Alternatively, if a session starts on an HSPA network, a secondary LTE connection 604 could be maintained via the packet core 630 for the HSPA network.

Returning again to FIG. 6, to minimize differential delays across the paths, in one configuration, a split for the two data-paths 604 and 608 for the two networks (LTE and HSPA) could happen at the EPC Serving-Gateway (S-GW) 614. In this configuration, packet data is routed to the UMTS Serving GPRS Support Node (SGSN) 634 and delivered to an HSPA RNC 640. In a further configuration, the S-GW 614 directly communicates with an HSPA RNC 640. This configuration includes a data path from the RNC 640 to the Internet 670 to be established via the LTE EPC 610. The Client UE 602 can request its PDP context to be established via the LTE EPC 610 (see 760 of FIG. 7).

Returning again to FIG. 7, when the Client UE 602 requests at time 730 an HSPA PDP_IP session, the UE 602 requests a data path via the LTE EPC 610, bypassing the HSPA PC (Packet Core) 630. In one configuration (shown in FIG. 6) a partial bypass of the HSPA packet core 630 is performed by using the SGSN 634. Another configuration (shown in FIG. 9) completely bypasses the HSPA packet core 630, essentially bypassing both the SGSN 634 and the GGSN 632 for the IP packets for the HSPA data path 606.

In one aspect, packets for one of the network connections could traverse directly or partly through the packet core for another network connection to reduce or minimize differential delay across paths. As an example, one configuration suggests that the packets for the HSPA connection 606 could traverse from the HSPA RNC 640 to the S-GW 614 (in the LTE EPC 610) as shown in FIG. 8.

Figure 8:
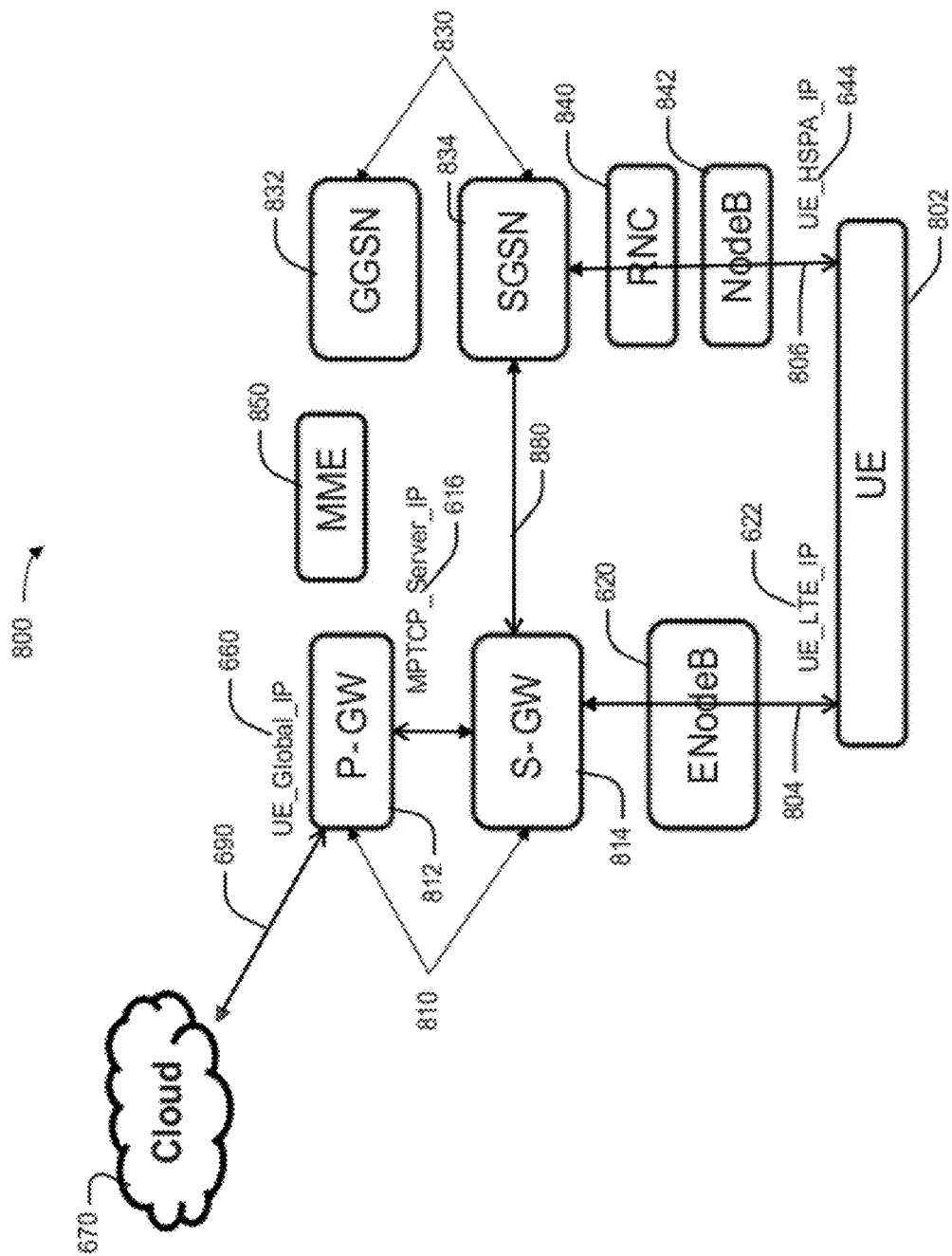
FIG. 8 is a block diagram illustrating Concurrent Bandwidth Aggregation across first and second Wireless Wide Area Networks (WWANs) according to a further aspect of the present disclosure.

FIG. 8 is a block diagram 800 illustrating Concurrent Bandwidth Aggregation across first and second Wireless Wide Area Networks (WWANs) according to a further aspect of the present disclosure. In this configuration, the S-GW 814 of the LTE EPC 810 acts as an MPTCP anchor and the S4 interface 880 between the S-GW 814 and the SGSN 834 (that is used for LTE to 3GPP handovers) is used for aggregation. It is to be noted that an S3 signaling interface between a mobility management entity (MME) 850 and the SGSN 834 is included in the control plane but is not shown in the user plane diagram 800.

In this configuration, the S4 interface between the S-GW 814 and the SGSN 834 essentially bypasses the GGSN 832 of the HSPA packet core 830 through the RNC 840 and the NodeB 842 of the HSPA data path 806 complete the. This architecture 800 may offer some advantages over the architecture in FIG. 6; specifically, a) charging/billing is simplified as all data passes through the P-GW 812 that generate charging events, b) QoS (Quality of Service) can be enforced at a single entity i.e., the P-GW 812 and there can be some QoS mapping while forking out the secondary path 880 via to the SGSN 834, and c) as the split is happening further downstream compared to FIG. 6, there will be less differential delay between the two paths 804, 806 to the UE 802.

Figure 9:
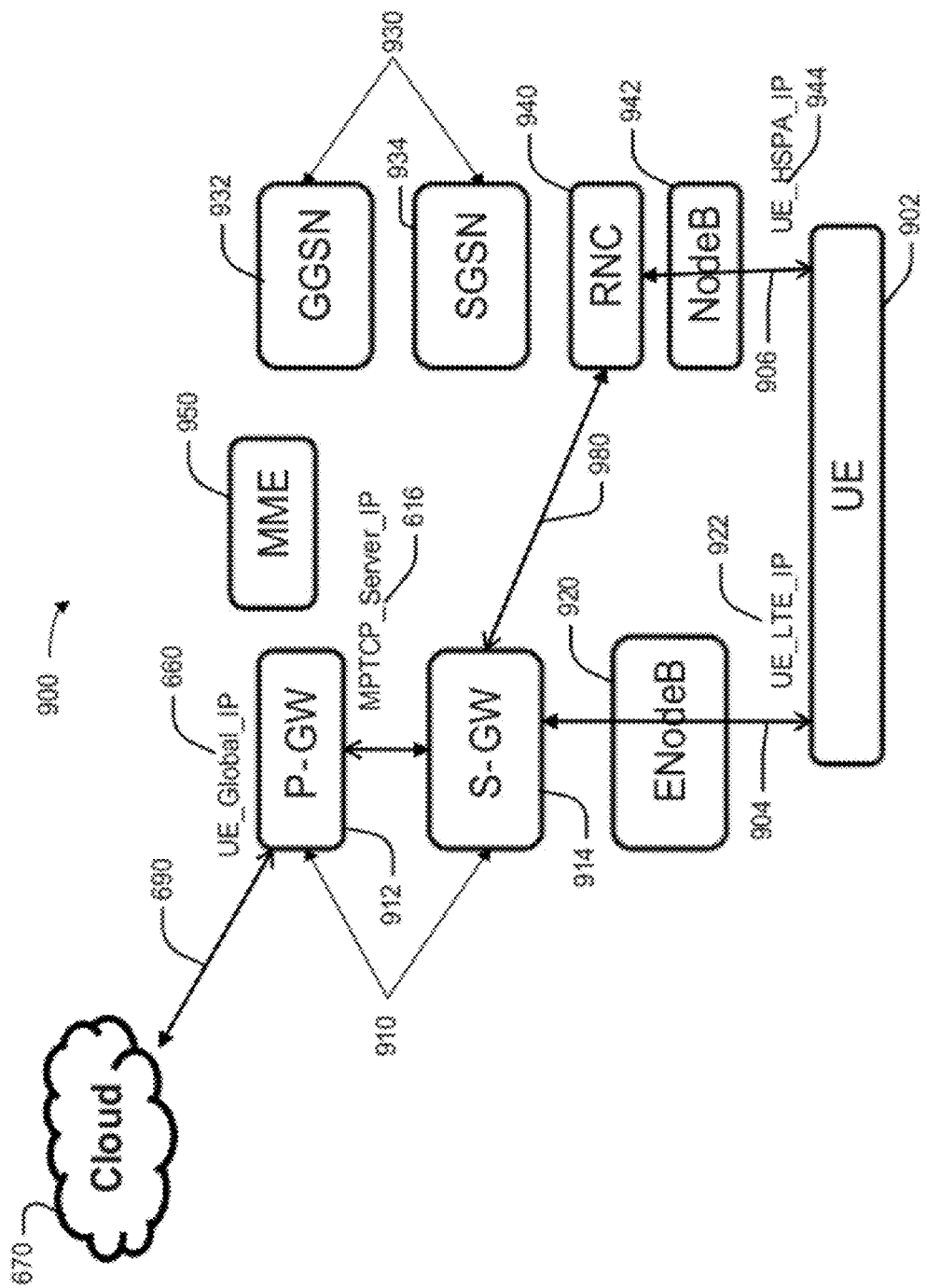
FIG. 9 is a block diagram illustrating Concurrent Bandwidth Aggregation across first and second Wireless Wide Area Networks (WWANs) according to a further aspect of the present disclosure.

FIG. 9 is a block diagram 900 illustrating Concurrent Bandwidth Aggregation across first and second Wireless Wide Area Networks (WWANs) according to a further aspect of the present disclosure. The architecture 900 in FIG. 9 may be similar to that in FIG. 8, a difference being that the S12 Direct Tunnel Architecture 980 from the S-GW 914 to the RNC 940 and the NodeB 942 is used. In one aspect, the S12 Direct Tunnel 980 enables bypassing of the SGSN 934 and the GGSN 932 of the HSPA packet core 930 for a further reduction of the differential delay.

Figure 10:
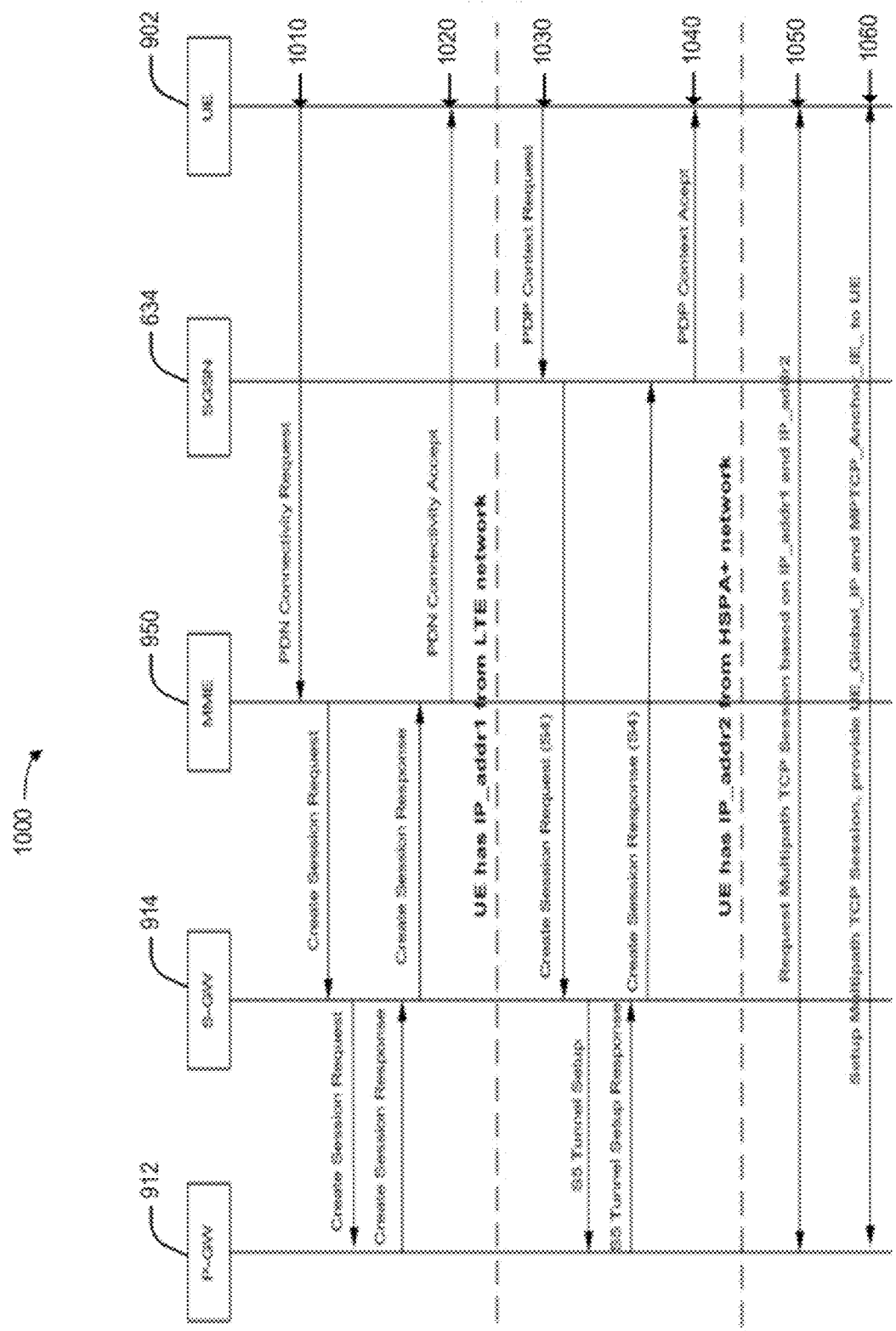
FIG. 10 is a call flow diagram illustrating setup of a MultipathTCP session over first and second Wireless Wide Area Networks (WWANs) according to one aspect of the present disclosure.

FIG. 10 is a call flow diagram 1000 illustrating an exemplary setup of a MultipathTCP session over first and second Wireless Wide Area Networks (WWANs) according to one aspect of the present disclosure. Representatively, the call flow diagram 1000 illustrates a process for establishing a primary path 904 over an LTE network and a secondary path 906 over an HSPA network with the P-GW 912 as an anchor, as shown in FIG. 9. In this configuration, the client device (UE) 902 sends at time 1010 a PDN connectivity request via the MME 950 for a first path 904 via the LTE wireless access network using the eNodeB 920. The request propagates from the MME 950 to the S-GW 914 and ultimately to the P-GW 912. In response, the P-GW 912 sends a create session response to the UE at time 1020 (via the S-GW 914 and MME 950).

Subsequently, the client device 902 sends at time 1030 a PDP context request to the SGSN 634 to establish the secondary HSPA path 906 via the LTE EPC 910 connecting through a HSPA NodeB 942 and the RNC 940. The request propagates from the SGSN 1032 to the S-GW 914 and ultimately to the P-GW 912. In response, the P-GW 912 sends a create session response to the UE at time 1040 (via the S-GW 914 and the SGSN 934).

In one aspect, the client device 902 can also indicate that the aggregation request is for robust aggregation or for additive aggregation. Robust aggregation can be utilized to guarantee performance utilizing the second HSPA path 906 as a fall-back option if there is performance degradation on the first LTE path 904. Alternatively, in this configuration, additive aggregation can be utilized to aggressively pursue additional bandwidth via the secondary HSPA path 906 to augment the bandwidth available on the first LTE path 904.

The client device 902 receives IP addresses (e.g., UE_LTE_IP 922 and UE_HSPA_IP 944) at times 1020 and 1040 for each of its connections (for LTE and for HSPA). The client device 902 can subsequently indicate at time 1050 to the P-GW 912 that the request at time 1050 is for a Multipath-TCP tunnel to be established via the LTE EPC 910. In response to the request, the P-GW 912 can provide the MultipathTCP tunnel address to establish the tunneled multipath TCP connection at time 1060. The description in FIG. 10 may be applicable for the architecture options illustrated in FIGS. 6, 8, and 9. In addition, similar call-flows may apply to other architectural options discussed, such as combining LTE and WiMAX networks, for example, as shown in FIGS. 13 and 14.

Figure 11:
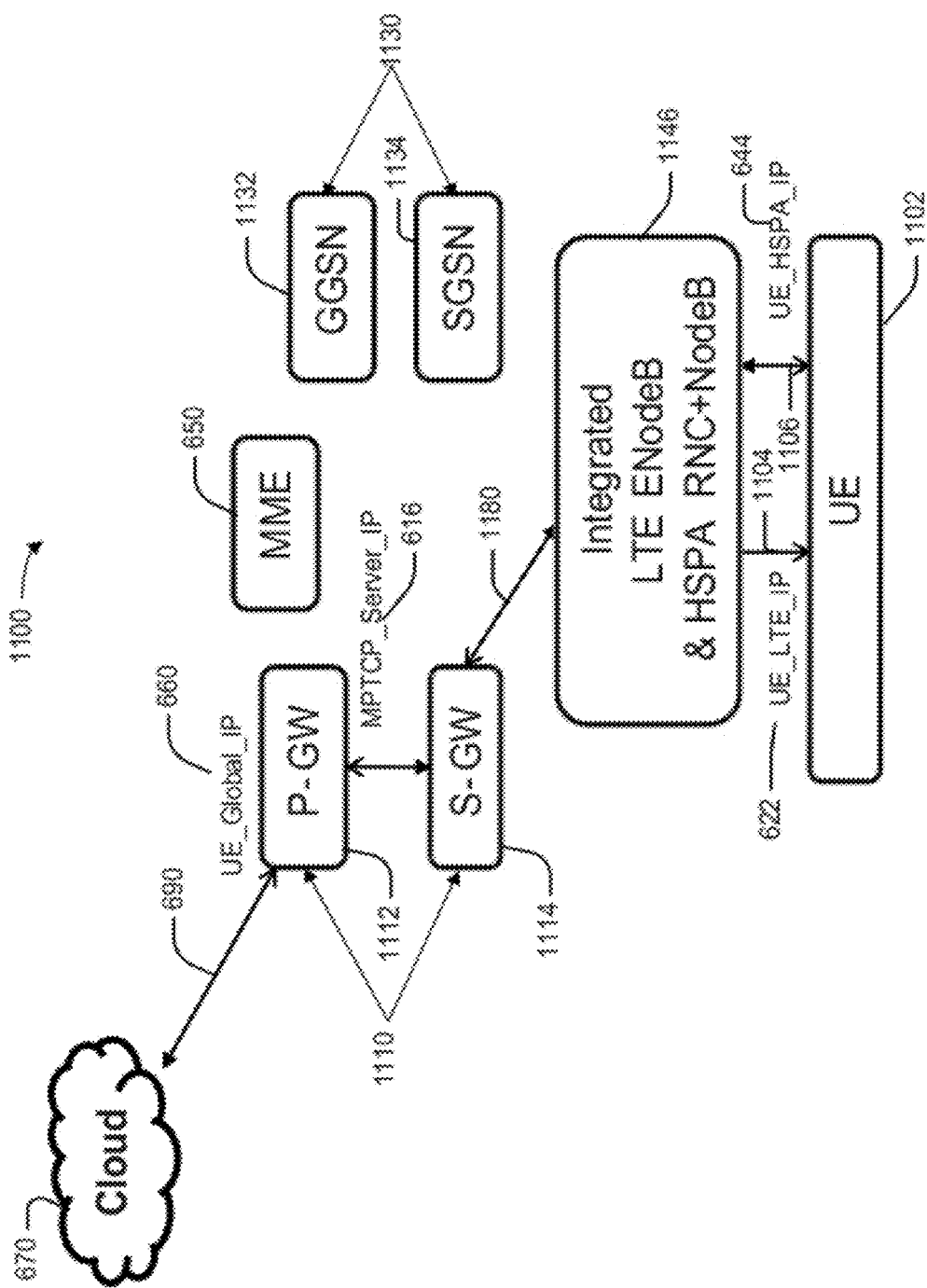
FIG. 11 is a block diagram illustrating Concurrent Bandwidth Aggregation across first and second Wireless Wide Area Networks (WWANs) according to a further aspect of the present disclosure.
Figure 12:
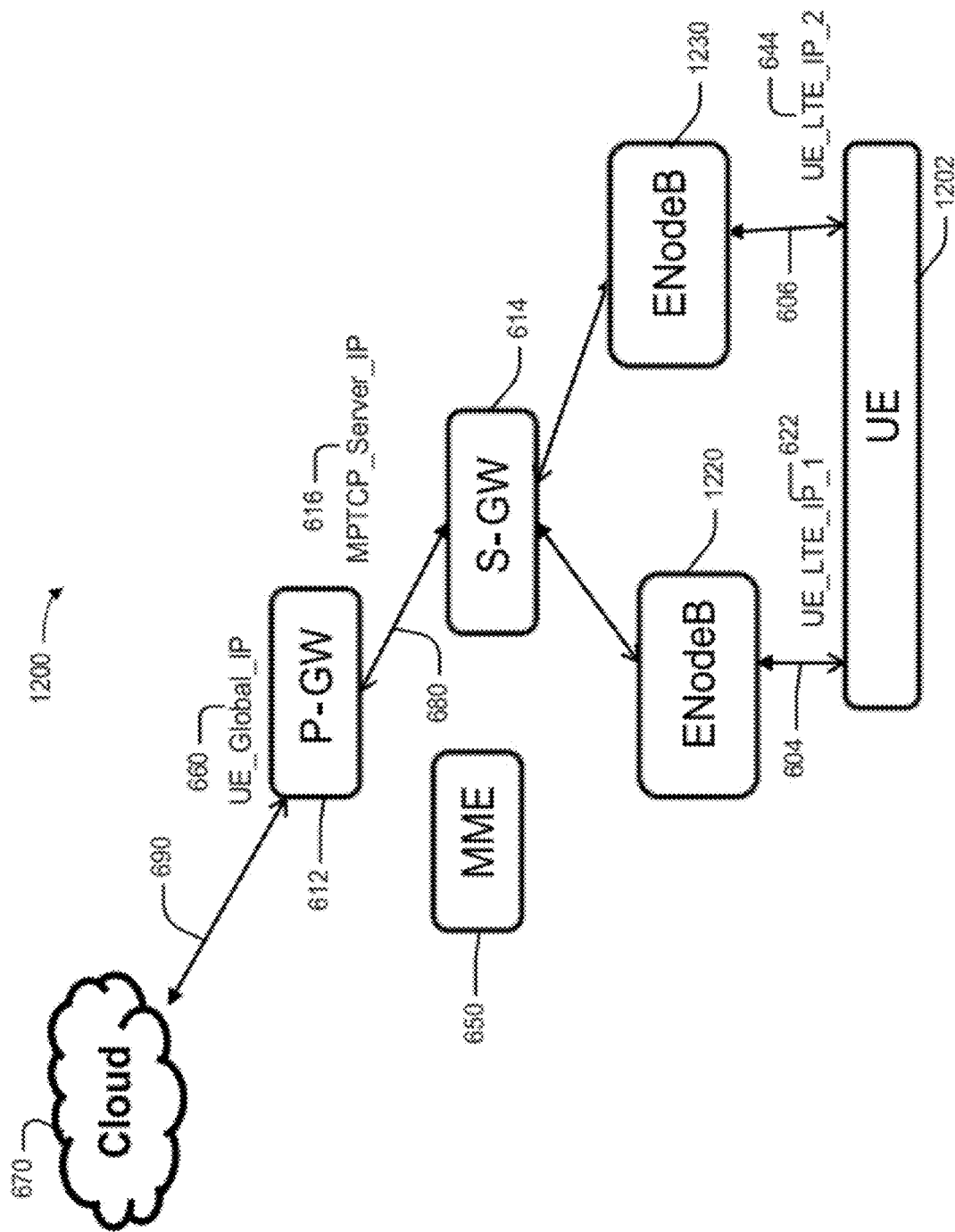
FIG. 12 is a block diagram illustrating Concurrent Bandwidth Aggregation across first and second Wireless Wide Area Networks (WWANs) according to a further aspect of the present disclosure.

FIG. 11 is a block diagram 1100 illustrating Concurrent Bandwidth Aggregation using an integrated base-station according to one aspect of the present disclosure. In one configuration, an integrated base-station 1146, including LTE eNodeB functionality and HSPA RNC+NodeB functionalities is described according to aspects of the present disclosure. In this configuration, the S-GW 1114 directly delivers the IP packets to the integrated base-station 1146 from the P-GW 1112 of the LTE EPC 1110. Representatively, FIG. 11 illustrates an option where there is an integrated LTE eNodeB and HSPA RNC+ NodeB 1146. In this configuration, the split happens as close to the client UE 1102 as possible for a further reduction of the differential delay across paths 1104 and 1106. In this configuration, the client UE 1102 requests a secondary augmentation path 1106 to the HSPA network but via the EPC 1110. Accordingly, the SGSN 1134 and the GGSN 1132 of the HSPA packet core 1130 are bypassed for a further reduction of the differential delay FIG. 12 illustrates a configuration 1200 where is the aggregation is performed across multiple LTE eNodeBs (e.g. 1220 and 1230) to the UE 1202 according to one aspect of the present disclosure. It is noted, that this configuration is more generic, as multiple eNodeBs are involved, while LTE multicarrier operation would have implied that the same LTE eNodeB is used.

Figure 13:
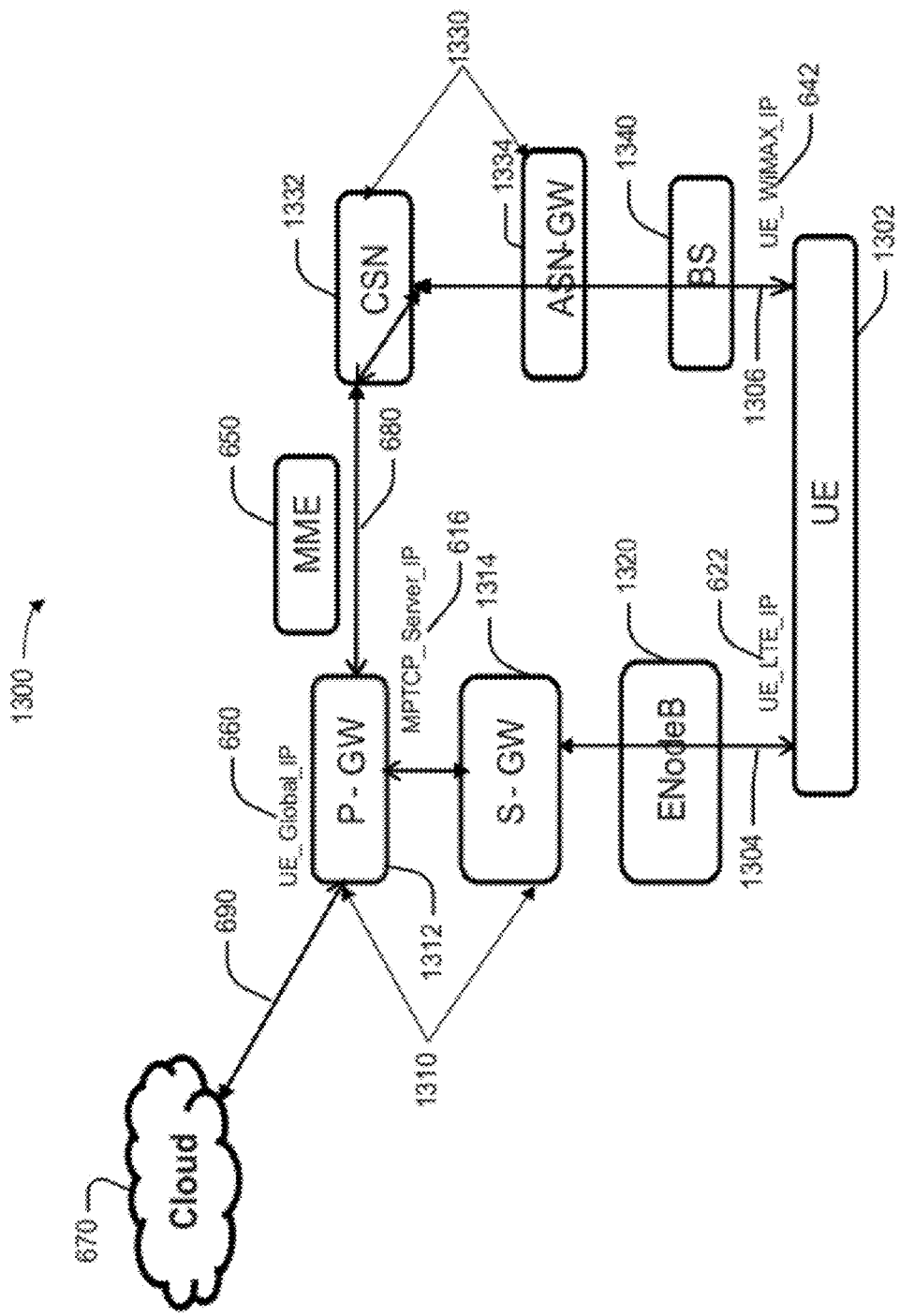
FIG. 13 is a block diagram illustrating Concurrent Bandwidth Aggregation across first and second Wireless Wide Area Networks (WWANs) according to a further aspect of the present disclosure.

FIG. 13 is a block diagram 1300 illustrating Concurrent Bandwidth Aggregation across LTE and WiMAX Wireless Wide Area Networks (WWANs) according to a further aspect of the present disclosure. In this configuration, aggregation is shown across LTE and WiMAX, with a tunneling anchor at the P-GW 1312. The LTE path 1304 is established from the UE 1302 through the ENodeB 1320, the S-GW 1314, and the P-GW 1312 of the LTE EPC 1310. The second (WiMAX) path 1306 is established via the CSN (Connectivity Service Network) node 1330 which connects to the ASN-GW (Access Service Network Gateway) 1334 which communicates with the BS (Base-station) 1340 which interacts with the UE 1302. In an alternative configuration, the tunneling anchor can be at the CSN node 1330 in the WiMAX core 1330.

Figure 14:
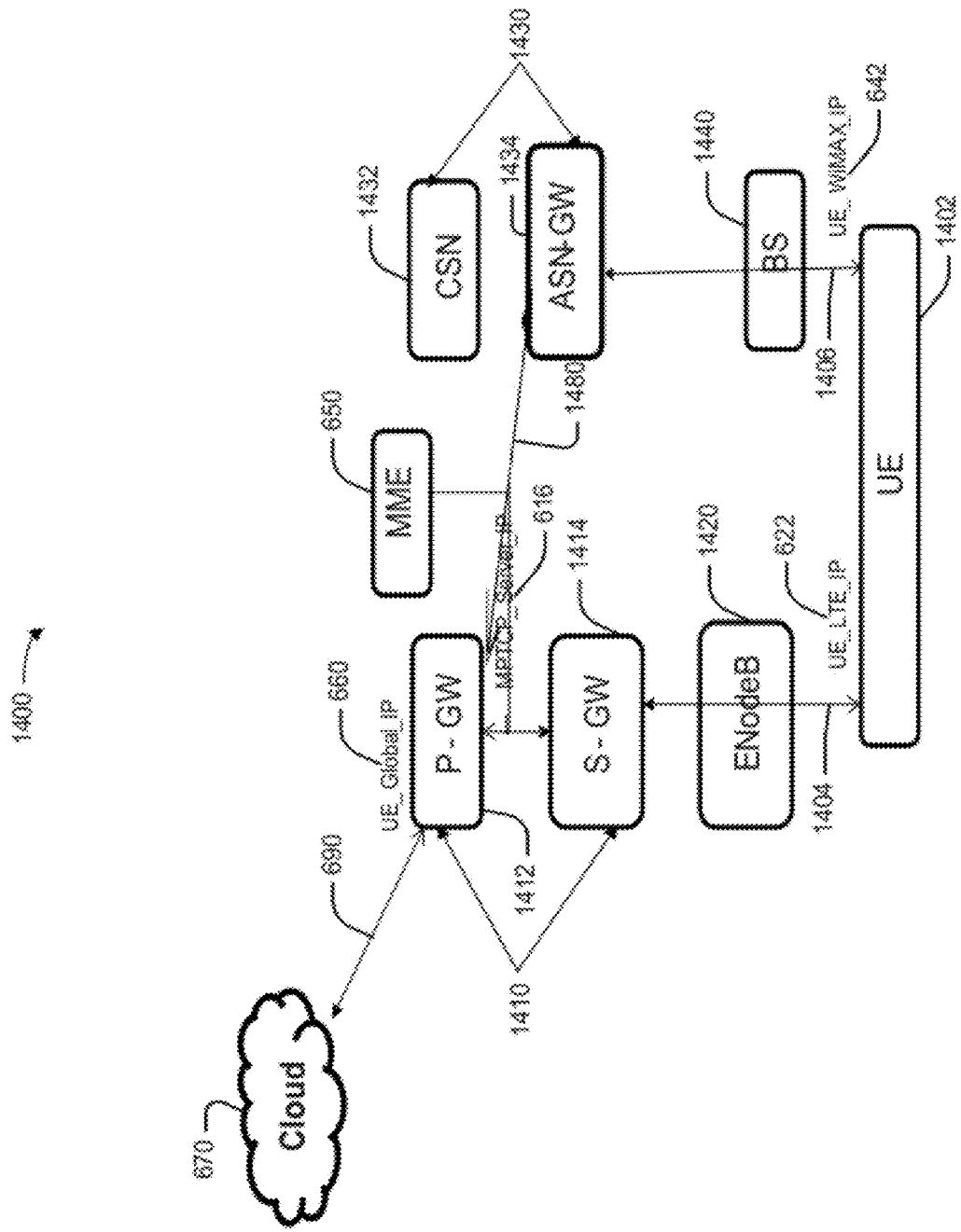
FIG. 14 is a block diagram illustrating Concurrent Bandwidth Aggregation across first and second Wireless Wide Area Networks (WWANs) according to a further aspect of the present disclosure.

FIG. 14 is a block diagram 1400 illustrating Concurrent Bandwidth Aggregation across LTE and WiMAX Wireless Wide Area Networks (WWANs) according to a further aspect of the present disclosure. In this configuration, aggregation is shown across the LTE and WiMAX networks, with a tunneling anchor at the P-GW 1412. The LTE path 1404 is established from the UE 1402 through the ENodeB 1420, the S-GW 1414, and the P-GW 1412 of the LTE EPC 1310. Representatively, a second (WiMAX) path 1406 is established directly from the P-GW 1412 via the ASN-GW 1434 (bypassing the CSN node 1432). In this configuration, the ASN-GW 1434 communicates with the BS (Base-station) 1440 which interacts with the UE 1402. In an alternative configuration, the tunneling anchor can be at the CSN node 1432 in the WiMAX network.

Representatively, a WiMAX data path 1406 is supported by the LTE packet core 1410, bypassing the WiMAX packet core network 1430 (i.e., bypassing the CSN node 1432 in the WiMAX network). In this configuration, the UE 1402 requests a second aggregation path 1480 from the ASN-GW 1434 via the LTE P-GW 1412 bypassing the CSN 1432, and requests the IP data session for WiMAX to be managed by the LTE EPC 1410. Alternatively, the tunneling anchor can be hosted at the CSN node 1432, with a direct connection from the eNodeB 1420 to the CSN 1432 bypassing the S-GW 1414 and the P-GW 1412.

Additional aggregation paths in WWANs can be utilized to increase performance by utilizing a second data path on a second wireless network. Such additional aggregation paths can be created so that they utilize the first core network for the first data path for a first wireless network, by completely or partially bypassing the second core network for the second wireless network, thereby helping to reduce or minimize the differential delay across the paths, when the paths are used for concurrent bandwidth aggregation.

Figure 15:
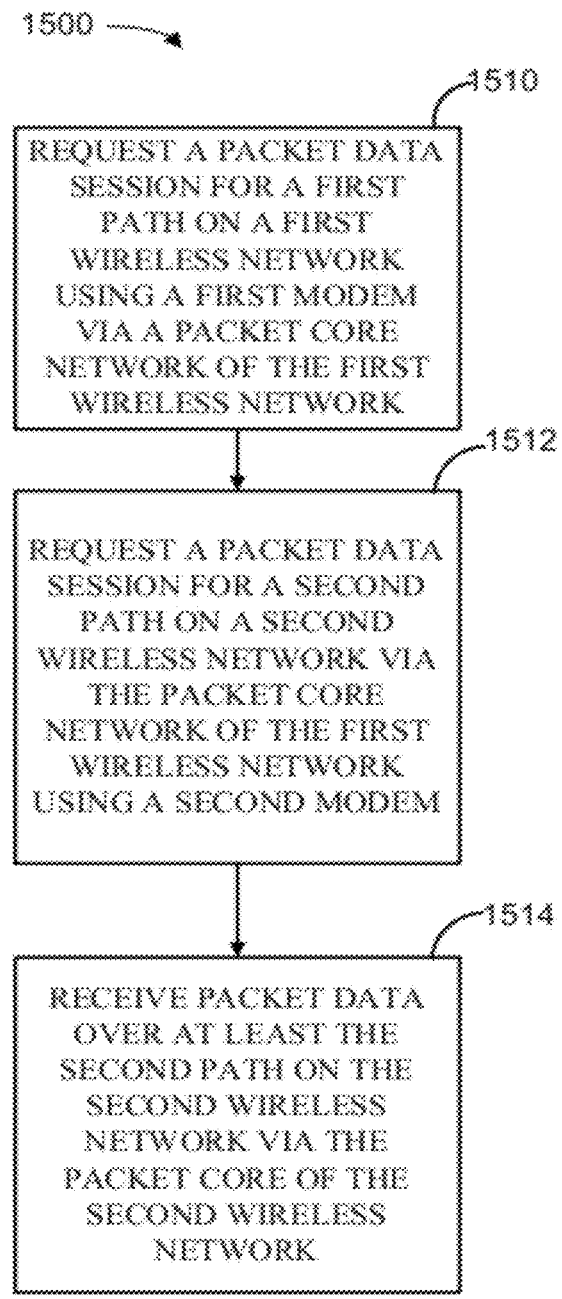
FIG. 15 is a block diagram illustrating a method for Concurrent Bandwidth Aggregation across first and second Wireless Wide Area Networks (WWANs) according to a further aspect of the present disclosure.

FIG. 15 illustrates a method 1500 for Concurrent Bandwidth Aggregation across first and second Wireless Wide Area Networks (WWANs) according to an aspect of the present disclosure. In block 1510, a multi-modem User Equipment (UE) requests a packet data session for a first path on a first wireless network using a first modem via a packet core network of the first wireless network. In block 1512, the UE requests a packet data session for a second path on a second wireless network via the packet core network of the first wireless network using a second modem. In one aspect, the second wireless network is a High Speed Packet Access (HSPA) network and the packet core network of the first wireless network is an Evolved Packet Core (EPC). In block

1514, the UE receives packet data over at least the second path on the second wireless network via the packet core network of the first wireless network.

In one configuration, an UE 120 is configured for wireless communication including means for requesting a packet data session for a first path on a first wireless network, as shown in FIG. 4. In one aspect, the request means may be the controller/processor 480 and/or the memory 482, the transmit processor 464, the modulators 454*a-t* and/or the antennas 452*a*-452*r* configured to perform the functions recited by the request means. The UE 120 is also configured to include a means for requesting a packet data session for a second path on a second wireless network via the packet core network of the first wireless network. In one aspect, this request means may be the controller/processor 480 and/or the memory 482, the transmit processor 464, the modulators 454*a-t* and/or the antennas 452*a*-452*r* configured to perform the functions recited by the request means. The UE 120 is also configured to include a means for receiving packet data over at least the second path on the second wireless network via the packet core network of the first wireless network. In one aspect, the receive means may be the receive processor 458, the memory 482, the controller/processor 480, the demodulators 454*a-t* and/or the antenna 452*a-t* configured to perform the functions recited by the receive means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a multi-modem user equipment (UE), comprising:
   requesting a packet data session for a first path on a first wireless network using a first modem of the multi-modem UE via a packet core network of the first wireless network;
   requesting a packet data session for a second path on a second wireless network via the packet core network of the first wireless network using a second modem of the multi-modem UE; and
   receiving packet data over at least the second path on the second wireless network via the packet core network of the first wireless network in which a tunneled connection is established for the first and second paths to converge to a common point such that the tunneled connection bypasses at least a portion of a packet core network of the second wireless network.

2. The method of claim 1 further comprising:
requesting a Multipath Transport Control Protocol (Multipath TCP) session with a Multipath Transport Control Protocol Server via the packet core network of the first wireless network using a first network Internet Protocol (IP) address for the first wireless network and a second network IP address for the second wireless network.

3. The method of claim 2 in which a Multipath Transport Control Protocol Tunnel is established with the Multipath Transport Control Protocol Server.

4. The method of claim 2 further comprising:
issuing a request for one of robust bandwidth aggregation and additive bandwidth aggregation using the Multipath Transport Control Protocol Server.

5. The method of claim 4 in which the request for the one of robust bandwidth aggregation and additive bandwidth aggregation is issued via a Multipath Transport Control Protocol (MultipathTCP) tunnel.

6. The method of claim 1 further comprising:
concurrently receiving the packet data over the first path on the first wireless network and the second path on the second wireless network via the packet core network of the first wireless network when additive bandwidth aggregation is requested.

7. The method of claim 1 further comprising:
receiving the packet data over only the second path when a performance degradation is detected for the first path when robust bandwidth aggregation is requested.

8. The method of claim 1 further comprising:
receiving the packet data over only the first path when a performance degradation is detected for the second path when robust bandwidth aggregation is requested.

9. The method of claim 1 further comprising:
issuing a request to establish the packet data session on the second wireless network, including the request for a connection via the packet core network of the first wireless network.

10. The method of claim 9 in which the request to establish the packet data session on the second wireless network is issued to a Mobility Management Entity (MME).

11. The method of claim 1 further comprising:
receiving a client tunneling address from one of the first or second wireless networks to use for a MultipathTCP tunnel; and
using a first network IP address and a second network IP address for the Multipath TCP session.

12. The method of claim 1 in which the first wireless network comprises one of a Long Term Evolution (LTE) network, a High Speed Packet Access (HSPA) Network, and a Worldwide Interoperability for Microwave Access (WiMAX) Network, a Wireless Local Area Network (WLAN), a Code Division Multiple Access 2000 1x (CDMA20001x) Network, a Universal Mobile Telecommunication System (UMTS) Network, and a TV Whitespace wireless network.

13. The method of claim 1 in which the second wireless network comprises one of a Long Term Evolution (LTE) network, a High Speed Packet Access (HSPA) Network, and a Worldwide Interoperability for Microwave Access (WiMAX) Network, a Wireless Local Area Network (WLAN), a Code Division Multiple Access 2000 1x
  (CDMA20001x) Network, a Universal Mobile Telecommunication System (UMTS) Network, and a TV Whitespace wireless network.

14. The method of claim 1 in which the first wireless network and the second wireless network are accessed via the same integrated base-station network node.

15. The method of claim 1 in which the first wireless network and the second wireless network are accessed via different network nodes.

16. The method of claim 1 further comprising selecting of the packet core network of the first wireless network for the second path is performed to reduce a differential delay between the first and second paths.

17. An apparatus configured for operation of a multi-modem user equipment (UE) in a wireless communication network, the apparatus comprising:
a memory; and
at least one processor coupled to the memory, the at least one processor being configured:
to request a packet data session for a first path on a first wireless network using a first modem of the multi-modem UE via a packet core network of the first wireless network;
to request a packet data session for a second path on a second wireless network via the packet core network of the first wireless network using a second modem of the multi-modem UE; and
to receive packet data over at least the second path on the second wireless network via the packet core network of the first wireless network in which a tunneled connection is established for the first and second paths to converge to a common point such that the tunneled connection bypasses at least a portion of a packet core network of the second wireless network.

18. The apparatus of claim 17 in which the at least one processor is further configured to request a Multipath Transport Control Protocol (MultipathTCP) session with a Multipath Transport Control Protocol Server via the packet core network of the first wireless network using a first network Internet Protocol (IP) address for the first wireless network and a second network IP address for the second wireless network.

19. The method of claim 18 in which a Multipath Transport Control Protocol Tunnel is established with the Multipath Transport Control Protocol Server.

20. The apparatus of claim 18 in which the at least one processor is further configured to issue a request for one of robust bandwidth aggregation and additive bandwidth aggregation using the Multipath Transport Control Protocol Server.

21. The apparatus of claim 20 in which the request for the one of robust bandwidth aggregation and additive bandwidth aggregation is issued via a Multipath Transport Control Protocol (MultipathTCP) tunnel.

22. The apparatus of claim 17 in which the at least one processor is further configured to concurrently receive the packet data over the first path on the first wireless network and the second path on the second wireless network via the packet core network of the first wireless network when additive bandwidth aggregation is requested.

23. The apparatus of claim 17 in which the at least one processor is further configured to receive the packet data over only the second path when a performance degradation is detected for the first path when robust bandwidth aggregation is requested.

24. The apparatus of claim 17 in which the at least one processor is further configured to receive the packet data over only the first path when a performance degradation is detected for the second path when robust bandwidth aggregation is requested.

25. The apparatus of claim 17 in which the at least one processor is further configured to issue a request to establish the packet data session on the second wireless network, including the request for a connection via the packet core network of the first wireless network.

26. The apparatus of claim 25 in which the request to establish the packet data session on the second wireless network is issued to a Mobility Management Entity (MME).

27. The apparatus of claim 17 in which the at least one processor is further configured:
to receive a client tunneling address from one of the first or second wireless networks to use for a MultipathTCP tunnel; and
to use a first network IP address and a second network IP address for the Multipath TCP session.

28. The apparatus of claim 17 in which the first wireless network comprises one of a Long Term Evolution (LTE) network, a High Speed Packet Access (HSPA) Network, and a Worldwide Interoperability for Microwave Access (WiMAX) Network, a Wireless Local Area Network (WLAN), a Code Division Multiple Access 2000 1x (CDMA20001x) Network, a Universal Mobile Telecommunication System (UMTS) Network, and a TV Whitespace wireless network.

29. The apparatus of claim 17 in which the second wireless network comprises one of a Long Term Evolution (LTE) network, a High Speed Packet Access (HSPA) Network, and a Worldwide Interoperability for Microwave Access (WiMAX) Network, a Wireless Local Area Network (WLAN), a Code Division Multiple Access 2000 1x (CDMA20001x) Network, a Universal Mobile Telecommunication System (UMTS) Network, and a TV Whitespace wireless network.

30. The apparatus of claim 17 in which the first wireless network and the second wireless network are accessed via the same integrated base-station network node.

31. The apparatus of claim 17 in which the first wireless network and the second wireless network are accessed via different network nodes.

32. The apparatus of claim 17 in which the at least one processor is further configured to select the packet core network of the first wireless network for the second path is performed to reduce a differential delay between the first and second paths.

33. A computer program product configured for wireless communication in a multi-modem user equipment (UE), the computer program product comprising:
a non-transitory computer-readable medium having non-transitory program code recorded thereon, the program code comprising:
program code to request a packet data session for a first path on a first wireless network using a first modem of the multi-modem UE via a packet core network of the first wireless network;
program code to request a packet data session for a second path on a second wireless network via the packet core network of the first wireless network using a second modem of the multi-modem UE; and
program code to receive packet data over at least the second path on the second wireless network via the packet core network of the first wireless network in which a tunneled connection is established for the first and second paths to converge to a common point such that the tunneled connection bypasses at least a portion of a packet core network of the second wireless network.

34. An apparatus operable for a multi-modem user equipment (UE) in a wireless communication system, the apparatus comprising:
means for requesting a packet data session for a first path on a first wireless network using a first modem of the multi-modem UE via a packet core network of the first wireless network;
means for requesting a packet data session for a second path on a second wireless network via the packet core network of the first wireless network using a second modem of the multi-modem UE; and
means for receiving packet data over at least the second path on the second wireless network via the packet core network of the first wireless network in which a tunneled connection is established for the first and second paths to converge to a common point such that the tunneled connection bypasses at least a portion of a packet core network of the second wireless network.

* * * * *